United States Patent
De Mare

(10) Patent No.: US 8,130,946 B2
(45) Date of Patent: Mar. 6, 2012

(54) ITERATIVE SYMMETRIC KEY CIPHERS WITH KEYED S-BOXES USING MODULAR EXPONENTIATION

(76) Inventor: Michael De Mare, Hoboken, NJ (US)

( * ) Notice: Subject to any disclaimer, the term of this patent is extended or adjusted under 35 U.S.C. 154(b) by 990 days.

(21) Appl. No.: 12/051,626

(22) Filed: Mar. 19, 2008

(65) Prior Publication Data

US 2008/0232597 A1    Sep. 25, 2008

Related U.S. Application Data

(60) Provisional application No. 60/895,876, filed on Mar. 20, 2007.

(51) Int. Cl.
*H04L 9/20* (2006.01)
*H04L 9/28* (2006.01)

(52) U.S. Cl. ............................... 380/28; 380/44; 380/46

(58) Field of Classification Search .................. 380/28, 380/29, 30, 44, 45, 46
See application file for complete search history.

(56) References Cited

U.S. PATENT DOCUMENTS

| | | | | |
|---|---|---|---|---|
| 5,687,238 | A * | 11/1997 | Shimada | 380/42 |
| 5,778,074 | A * | 7/1998 | Garcken et al. | 380/37 |
| 2003/0031316 | A1 * | 2/2003 | Langston et al. | 380/28 |

OTHER PUBLICATIONS

Shimizu & Miyaguchi, Fast Data Encipherment Algorithm FEAL, Electrical Communication Laboratories, NTT, 14 pgs., 1998, Springer-Verlag, Japan.
Lai & Massey, A Proposal for a New Block Encryption Standard, 1998, 16 pgs., Springer-Verlag, Switzerland.
Fumy, On the F-function of FEAL, 1998, 4 pgs., Springer-Verlag, West Germany.
Feistel et al., Some Cryptographic Techniques for Machine-to-Machine Data Communications, Proceedings of the IEEE, Nov. 1975, pp. 1545-1554, vol. 63, No. 11.
Bennett et al., Strengths and weaknesses of quantum computing, Dec. 11, 1996, 29 pgs.
Menezes et al. Handbook of Applied Cryptography,1997 by CRC Press, Inc., 1996, 61 pgs.
Data Encryption Standard (DES), Federal Information Procesing Standards Publication, Category: Computer Security, Subcategory: Cryptography, Oct. 25, 1999, 26 pgs., FIPS PUB 46-3.
Cryptographic Protection for Data Processing Systems, Cryptographic Transformation Algorithm*, Government Standard of the U.S.S.R., Jul. 1, 1990—Translation Oct. 11, 2004, 24 pgs., UDC 681.325.6:006.354, Group P85.
Massey, Safer K-64: A Byte-Oriented Block-Ciphering Algorithm, Fast Software Encryption, Lecture Notes in Computer Science No. 809, pp. 1-17, Springer, New York.
Shimizu, et al., "Fast Data Encipherment Algorithm FEAL," *Advances in Cryptology—Eurocrypt'87*, vol. 304/1988 of *Lecture Notes in Computer Science*, pp. 267-281, © 1998, Springer-Verlag.
Lai, et al., "A Proposal for a New Block Encryption Standard," *Advances in Cryptology—Eurocrypt'90*, vol. 473/1991 of *Lecture Notes in Computer Science*, pp. 389-404, © 1998, Springer-Verlag.

(Continued)

*Primary Examiner* — Edward Zee
(74) *Attorney, Agent, or Firm* — Jon A. Gibbons; Fleit Gibbons Gutman Bongini & Bianco PL

(57) ABSTRACT

Disclosed is the design and development of a new cipher called the Dragonfire Cipher. The Dragon cipher includes message authentication code and keyed random number generator. Dragonfire cipher takes this transparent method of generating S-boxes and uses them to create a cipher with keyed S-boxes. This defeats most precomputations for cryptanalysis as the S-boxes are now different between sessions.

17 Claims, 18 Drawing Sheets

OTHER PUBLICATIONS

Fumy, W., "On the F-Function of FEAL," *Advances in Cryptology—Crypto'87*, vol. 293/1988 of *Lecture Notes in Computer Science*, pp. 434-437, © 1998, Springer-Verlag.

Feistel, et al., "Some Cryptographic Techniques for Machine-to-Machine Data Communications," *Proceedings of the IEEE*, 63(11):1545-1554, Nov. 1975.

Bennett, et al., "Strengths and Weaknesses of Quantum Computing," *SIAM Journal on Computing*, 26(5):1-29, 1997.

Menezes, et al., "Chapter 7: Block Ciphers," *Handbook of Applied Cryptography*, pp. 223-282, CRC Press, 1997.

"Data Encryption Standard (DES)," U.S. Department of Commerce/National Institute of Standards and Technology, FIPS Publication 46-3, Category: Computer Security, Subcategory: Cryptography, pp. 1-22, Oct. 25, 1999.

"Advanced Encryption Standard (AES)," Federal Information Processing Standards Publication 197, pp. 1-47, Nov. 26, 2001.

Government Standard for the U.S.S.R., "Cryptographic Protection for Data Processing Systems—Cryptographic Transformation Algorithm", UDC 681:325.6:006.354, Effective Date Jul. 1, 1990, GOST 28147-89, Aleksandr Malchik (translator).

Massey, J., "SAFER K-64: A Byte-Oriented Block-Ciphering Algorithm," *Fast Software Encryption 1993*, vol. 809/1994 of *Lecture Notes in Computer Science*, pp. 1-17, Springer, 1994.

O'Conner, L., On The Distribution of Characteristics in Bijective Mappings, *Journal of Cryptology*, vol. 8, pp. 1-24, Springer, Mar. 1995.

Schneier, et al., "On The Twofish Key Schedule," *Fifth Annual Selected Areas in Cryptography, SAC/'98*, vol. 1556/1999 of *Lecture Notes in Computer Science*, 1998, pp. 1-17.

Youssef, et al., "Resistance of Balanced S-boxes to Linear and Differential Cryptanalysis," *Information Processing Letters*, 56(5):1-9, 1995.

Shannon, C., "Communication Theory of Secrecy Systems," John Wiley and Sons, 1949, http://netlab.cs.ucla.edu/wiki/files/shannon1949.pdf, pp. 656-715.

\* cited by examiner

```
Input: k, p
Output: c

L := p[0]..p[63];
R := p[64]..p[128];
B := k;
S[box number][index] := Pineapple S-boxes
        for i:=1 to 16 do
        begin
                L := L XOR (B[0]..B[63]);
                ROTATE B left 16 bits;
                for j=1 to 8 do
                begin
                 L[8j+0]..L[8j+7] := S[j][L[8j+0]..L[8j+7]];
                end;
                R := L XOR R;
                SWAP L,R;
        end;
c[0]..c[63] := L;
c[64]..c[127] := R;
```

FIG. 3    PRIOR ART

Data for 10000000 iterations.

| input bit | output bit | number of differences | bias |
|---|---|---|---|
| 77 | 121 | 5005927 | 0.000593 |
| 106 | 50 | 5005251 | 0.000525 |
| 94 | 114 | 5005330 | 0.000533 |
| 58 | 74 | 5005780 | 0.000578 |
| 16 | 61 | 5005557 | 0.000556 |
| 113 | 34 | 5006131 | 0.000613 |
| 4 | 1 | 5005224 | 0.000522 |
| 68 | 116 | 5005327 | 0.000533 |

FIG. 5   PRIOR ART

Data for 10000000 iterations.

| input bit | output bit | number of differences | bias |
|---|---|---|---|
| 112 | 80 | 4994610 | 0.000539 |
| 16 | 31 | 4994120 | 0.000588 |
| 18 | 41 | 4994052 | 0.000595 |
| 31 | 23 | 4994592 | 0.000541 |
| 40 | 103 | 4994421 | 0.000558 |
| 120 | 3 | 4994114 | 0.000589 |
| 39 | 42 | 4994606 | 0.000539 |
| 49 | 41 | 4994537 | 0.000546 |

FIG. 6   PRIOR ART

```
Input: int Count[128,128]
Output: int Count[128,128]
(* generate a random vector of 128 bits *)
for i=1 to 128 do
    plaintext[i]=random(2);
end;
(* encrypt it with key=0 *)
ciphertext=encrypt(plaintext, 0);
(* compare each bit of the plaintext with
   each bit of the ciphertext *)
for i=1 to 128 do
    for j=1 to 128
        if (plaintext[i] XOR ciphertext[j]) then
            Count[i,j]:=Count[i,j]+1;
```

FIG. 7    PRIOR ART

```
Input:
Output: Integer HammingDistance[0..16]
(* Choose a random 128 bit word, p *)
for i=1 to 128 do
begin
        p[i]:=rand(2);
end;
(* encrypt p *)
z[0]:=p;
for i:=1 to 16 do
begin
        z[i]:=round(i, z[i-1]);
        a[i]:=z[i];
end;
(* q gets p with one bit changed *)
q:=p;
j:=rand(128); (* Select a random bit *)
q[j]:=q[j] XOR 1; (* Change it *)
z[0]=q;
(* encrypt q *)
for i:=1 to 16 do
begin
        b[i]:=round(i, z[i-1]);
        b[i]:=z[i];
end;
(* Compute the Hamming distance after each round *)
for i:=1 to 16 do
begin
        x[i]:=a[i] XOR b[i];
        HammingDistance[i]:=0;
        for j:=1 to 128 do
        begin
          if x[i,j]=1 then
              HammingDistance[i]:= HammingDistance[i]+1;
        end;
end;
```

FIG. 8  PRIOR ART 100000000 iterations

| round | mean no. of changed bits | std. dev. |
|---|---|---|
| 1 | 4.968537 | 4.715591 |
| 2 | 25.012363 | 21.593784 |
| 3 | 51.341941 | 18.754201 |
| 4 | 62.763035 | 7.992849 |
| 5 | 63.962781 | 5.772247 |
| 6 | 63.997763 | 5.659716 |
| 7 | 64.000572 | 5.656235 |
| 8 | 64.001648 | 5.656292 |
| 9 | 63.999561 | 5.656359 |
| 10 | 64.000641 | 5.656919 |
| 11 | 64.001130 | 5.655820 |
| 12 | 64.000995 | 5.656275 |
| 13 | 64.001473 | 5.656939 |
| 14 | 64.000276 | 5.656507 |
| 15 | 64.000738 | 5.656922 |
| 16 | 63.999701 | 5.656163 |

FIG. 9    PRIOR ART

```
for i=1 to 128 do
        indata[i]:=random(2);
out1:=encrypt(in, key);
indata[bit]=indata[bit] XOR 1;
out2:=encrypt(indata, key);
for i=1 to 128 do
        diffs[i]=diffs[i]+ (out1[i] XOR out2[i]);
```

FIG. 10    PRIOR ART 10000000 iterations

| bit changed | output bit | number of diffs | bias |
|---|---|---|---|
| 59 | 16 | 4994228 | 0.000577 |
| 21 | 66 | 4994386 | 0.000561 |
| 85 | 59 | 4994576 | 0.000542 |
| 35 | 33 | 4994846 | 0.000515 |
| 2 | 23 | 4994886 | 0.000511 |
| 64 | 105 | 4994940 | 0.000506 |
| 5 | 73 | 4995000 | 0.000500 |
| 91 | 38 | 4995012 | 0.000499 |
| 83 | 71 | 5005932 | 0.000593 |
| 92 | 50 | 5005834 | 0.000583 |
| 120 | 43 | 5005475 | 0.000548 |
| 53 | 85 | 5005468 | 0.000547 |
| 102 | 12 | 5005446 | 0.000545 |
| 121 | 124 | 5005336 | 0.000534 |
| 22 | 39 | 5005296 | 0.000530 |
| 27 | 83 | 5005170 | 0.000517 |

FIG. 11  PRIOR ART

| changed bit 1 | changed bit 2 | output bit | iterations | differences | bias |
|---|---|---|---|---|---|
| 67 | 20 | 112 | 10000000 | 4992202 | 0.000780 |
| 57 | 30 | 26 | 10000000 | 4992419 | 0.000758 |
| 48 | 12 | 9 | 10000000 | 4992560 | 0.000744 |
| 126 | 117 | 97 | 10000000 | 4992620 | 0.000738 |
| 120 | 68 | 79 | 10000000 | 5007236 | 0.000724 |
| 40 | 23 | 127 | 10000000 | 4992799 | 0.000720 |
| 114 | 37 | 96 | 10000000 | 5007172 | 0.000717 |
| 72 | 56 | 99 | 10000000 | 4992850 | 0.000715 |
| 75 | 20 | 62 | 10000000 | 4992858 | 0.000714 |
| 46 | 18 | 96 | 10000000 | 4992917 | 0.000708 |
| 81 | 33 | 37 | 10000000 | 4992969 | 0.000703 |
| 92 | 7 | 24 | 10000000 | 4992993 | 0.000701 |
| 121 | 82 | 20 | 10000000 | 5007005 | 0.000700 |
| 123 | 121 | 60 | 10000000 | 5007000 | 0.000700 |
| 25 | 14 | 56 | 10000000 | 4993055 | 0.000695 |
| 121 | 105 | 1 | 10000000 | 4993080 | 0.000692 |

FIG. 12  PRIOR ART

| test | secure p-value | fast p-value | 3DES |
|---|---|---|---|
| block-frequency | 0.990675 | 0.758270 | 0.757018 |
| cumulative sums (1) | 0.612388 | 0.626252 | 0.073236 |
| cumulative sums (2) | 0.733891 | 0.502622 | 0.329148 |
| fft | 0.002777 | 0.006648 | 0.008033 |
| frequency | 0.596805 | 0.381574 | 0.170843 |
| stats (1) | 0.581102 | 0.710089 | 0.516578 |
| stats (2) | 0.268324 | 0.192640 | 0.939444 |

FIG. 15

```
Input:  byte key[]
Output:  byte enc_S_box[8][256], byte dec_S_box[8][256]

if  keylength=256   then  step:=32  else
if  keylength=384   then  step:=48  else
if  keylength=512   then  step:=64  else
if  keylength=768   then  step:=96  else
if  keylength=1024  then  step:=128 else
error;
doublekey:=key  concat  key;
hashkey=p(key[0..128]) XOR p(key[129..255])
        [XOR p(key[256..383] [XOR p(key[384..511])
        [XOR p(key[512..767]) [XOR p(key(768..1023)]]]];
for  k:=0 to 7 do
begin
        b:=hashkey[k*8];
        int c:=b shift right 7;
        b:=b AND 127;
        int g:=gens[b];
        for i:=0 to 255 do
                enc_S_box[k][i]:=expmod257(g, i+c)-1;
        for j:=0 to 255 do
                dec_S_box[k][enc_S_box[number][j]]:=j;
end;
for k:=0 to 7 do
begin
        subkeys[k*128..((k+1)*128)-1]:=
                p(doublekey[k*step..127+k*step]);
end;
```

FIG. 17

```
Input: k, p
Output: c

L := p[0]..p[63];
R := p[64]..p[128];
B := subkeys;
        for i:=1 to 16 do
        begin
                L := L XOR (B[0]..B[63]);
                ROTATE B left 64 bits;
                for j=1 to 8 do
                begin
                  L[8j+0]..L[8j+7] := S[j][L[8j+0]..L[8j+7]];
                end;
                R := L XOR R;
                SWAP L,R;
        end;
c[0]..c[63] := L;
c[64]..c[127] := R;
```

FIG. 18

```
Input:  byte iv[16], mask[16];
Output: bit p := iv XOR mask;
for l:=1 to 16 do
begin
   L := p[0]..p[63];
   R := p[64]..p[128];
   B := k;
   for i:=1 to 16 do
   begin
      L := L XOR (B[0]..B[63]);
      ROTATE B left 16 bits;
      for j=1 to 8 do
         L[8j+0]..L[8j+7] := S[j][L[8j+0]..L[8j+7]];
      R := L XOR R;
      SWAP L,R;
   end;
   c[0]..c[63]  := L;
   c[64]..c[127] := R;
end;
iv=c;
bit:=c[0] XOR c[64];
```

FIG. 19

```
Input:  byte iv[16], mask[16];
Output: bits[64]

p := iv XOR mask;
for l:=1 to 16 do
begin
   L := p[0]..p[63];
   R := p[64]..p[128];
   B := k;
   for i:=1 to 16 do
   begin
      ROTATE B left 16 bits;
      L := L  XOR (B[0]..B[63]);
      for j=1 to 8 do
          L[8j+0]..L[8j+7] := S[j][L[8j+0]..L[8j+7]];
      R := L XOR R;
      SWAP L,R;
   end;
   c[0]..c[63]  := L;
   c[64]..c[127] := R;
end;
iv=c;
bits[0..63]:=c[0] XOR c[64]..c[63] XOR c[127]
```

ITERATIVE SYMMETRIC KEY CIPHERS WITH KEYED S-BOXES USING MODULAR EXPONENTIATION

CROSS-REFERENCE TO RELATED APPLICATIONS

This application is based upon and claims priority from prior U.S. provisional patent application No. 60/895,876, filed on Mar. 20, 2007, which is commonly assigned herewith to inventor Michael de Mare, the entire disclosure of which is herein incorporated by reference.

FIELD OF THE INVENTION

The present invention relates generally to iterative ciphers in symmetric key cryptosystems, in particular, using S-boxes with symmetric key ciphers.

BACKGROUND OF THE INVENTION

Iterated ciphers are the state of the art in symmetric key cryptosystems. Iterated ciphers are ciphers in which a simple function is applied repeatedly a number of times. Each time the function is applied is called a round. See FIG. 1. The function f is applied n times. The function is usually a combination of a permutation, an XOR between some or all of the intermediate text with the key and lookups into a table called an S-box.

One challenge with the prior art systems is to allow people to use ciphers that you do not trust. Prior art systems such as Pineapple, provide transparent methods of choosing S-boxes. However, there is no solution takes that takes this transparent method of generating S-boxes and uses it to create a cipher with keyed S-boxes.

According what is needed is a method and system to overcome the aforementioned challenges encountered in the prior art and to provide a method of choosing S-boxes to create a cipher with keyed S-boxes.

SUMMARY OF THE INVENTION

The present invention provides a method and system to create a new cipher called Dragonfire. The computer program product, system and method of Dragonfire encrypts a block of data. The method begins with receiving a variable length key which is used to select a plurality of encrypting S-boxes with known security properties. A plurality of fixed length encrypting subkeys are generated based upon the variable length key. A block of data is encrypted using the S-boxes and the encrypting subkeys in a predetermined number of rounds.

The present invention in one embodiment describes how to create a plurality of encrypting S-boxes which are balanced keyed S-boxes so that a set of uniformly chosen inputs from a range of inputs produces a set of outputs within a range by permutation. The encrypting S-boxes in another embodiment include encrypting polymorphic S-boxes and/or encrypting S-boxes using a hash of the variable length key.

The present invention in other embodiments includes creating the plurality of encrypting S-boxes including generators and the encrypting S-boxes by exponentiating generators modulo 257. The generators are selected from a table using the variable length key. In one example the table is constructed using 128 generators modulo 257. It has been shown advantageously that eight bits of hash of key may be used to select the S-Box, seven bits for the generator and one bit for the offset. However other numbers of bits are within the true scope and spirit of the present invention. In addition S-boxes may be used in all of the rounds or in only a few of the rounds.

The present invention in other embodiments includes generating the plurality of fixed length encrypting subkeys can be based upon the variable length key form pseudo-independent sub-keys. The sub-keys k, $s_1$ and $s_2$ are pseudo-independent when i) a maximum probability for a bit of k to be determined given less than all the bits of $s_1$ and $s_2$ is $Pr(\det(k_i)) < 1/|k|$ ii) a maximum probability that a bit of $s_1$ can be determined given only $s_2$ is $Pr(\det(s_{1,i})) < 1/|s_1|$ and iii) a maximum probability that a bit of $s_2$ can be determined given only $s_1$ is $Pr(\det(s_{2,i})) < 1/|s_2|$ The present invention in other embodiments includes generating a plurality of variable length decrypting subkeys based upon the variable length key; and decrypting the block data using the S-boxes and the decrypting sub-keys in a predetermined number of rounds. The variable length key has a length from 256 bits to 1024 bits in 128 bit increments.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings in which:

FIG. 3 is an algorithm implementing the Pineapple encryption algorithm;
FIGS. 5 and 6 are tables of the correlation experiment for Pineapple;
FIG. 7 is a single iteration of the correlation security experiment;
FIG. 8 is a single iteration of the Avalanche security experiment;
FIG. 9 is the experiment results of FIG. 8;
FIG. 10 is a differential analysis iteration;
FIGS. 11 and 12 are tables of the differential analysis for Pineapple;
FIG. 15 are the results from NIST test on Dragonfire PRNG;
FIG. 17 is additional initialization for Dragonfire;
FIG. 18 is Dragonfire encryption algorithm;
FIG. 19 is Dragonfire PRNG secure;
and
FIG. 20 is a Dragonfire PRNG fast.

DESCRIPTION OF THE PREFERRED EMBODIMENTS

Figure 1:
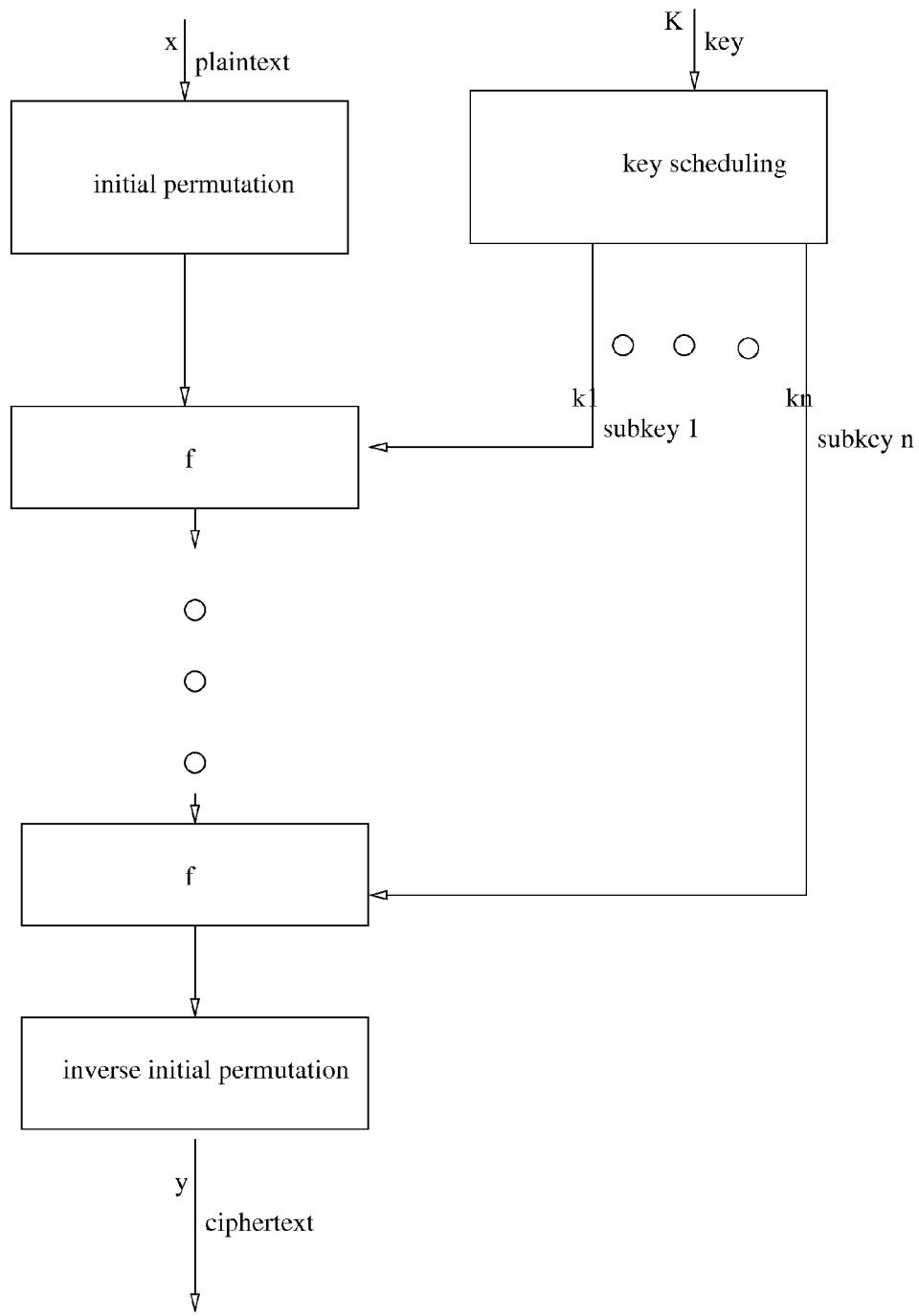
FIG. 1 is a diagram of the overview of an iterative cipher.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others.

In general, unless otherwise indicated, singular elements may be in the plural and vice versa with no loss of generality.

The present invention has many advantages over the prior art system. One advantage is a design and development of a new cipher called the Dragonfire Cipher that includes keyed random number generator. The present invention analyzes a simpler, related cipher, called Pineapple, to make assessments of the security of the system. The advantage to the Pineapple cipher is that the method of choosing S-boxes is transparent. This allows people to use ciphers provided to them by entities who they do not trust. The Dragonfire cipher takes this transparent method of generating S-boxes and uses them to create a cipher with keyed S-boxes. This defeats most precomputations for cryptanalysis as the S-boxes are now different between sessions. This can also be used for message authentications codes (MACs) which are keyed hash functions and keyed pseudorandom number generators (PRNGs). In one embodiment, a MAC may be constructed called the Dragonfire MAC and a PRNG called the Dragonfire PRNG.

Dragonfire: A Cipher with Polymorphic S-Boxes

Unlike many other block ciphers, our cipher has a large enough key size for the post-quantum model with a single application of the cipher. Other advantages of our cipher are keyed S-boxes and pseudo-independent subkeys. Many other ciphers such as FEAL, IDEA, DES, GOT 28147 Rinjdael, Blowfish, Twofish, SAFER are known to those skilled in the art. Truly random bits can be quickly generated using quantum methods by sending a zero qubit through a Hadamard transform and measuring the resulting state. Unfortunately, this requires special hardware which may not be technologically feasible. With a secure pseudorandom number generator a short initial state or seed may be shared and as many pseudorandom bits as necessary may be synchronously generated. One of the popular types of pseudorandom generators is based on elliptic curves, which are not secure under the post-quantum model. (For more information please refer to A. J. Menezes and T. Okamoto and S. A. Vanstone, Reducing Elliptic Curve Logarithms To Logarithms In A Finite Field, IEEE Transactions on Information Theory, September 1993, Vol. 39, Issue 5, pages 1639-1646, which is hereby incorporated by reference in its entirety.

Iterated ciphers are the state of the art in symmetric-key cryptosystems. The present invention describes common elements of iterated cipher design, cryptanalytic techniques against iterated ciphers, and some examples of representative iterated ciphers including a cipher new to this thesis called the Dragonfire cipher. Our security analysis of Dragonfire is based on heuristic tests rather than formal proofs. The usual method of evaluating ciphers is to publish them in the literature to allow other researchers to try to develop cryptanalytic attacks on them. Innovations in the Dragonfire cipher include balanced keyed S-boxes and pseudo-independent subkeys. Balanced keyed S-boxes have the advantages of keyed S-box ciphers such as Twofish which include making it impossible to precompute cryptanalytic tables for cryptanalytic methods such as differential cryptanalysis while also having the advantages of balanced S-boxes which are believed to have good security properties (For more information please refer to Amr M. Youssef and Stafford E. Tavares, Resistance of Balanced S-Boxes to Linear and Differential Cryptanalysis, Information Processing Letters, Vol. 56, No 5, pages 249-252, 1995 available at "citeseer.ist.psu.edu/66829.html", which is hereby incorporated by reference in its entirety). Pseudo-independent subkeys increase the workload of a cryptanalyst by making it difficult for him to learn bits of many subkeys by learning a bit of a single subkey. The Dragonfire cipher is more appropriate to the post-quantum model than other ciphers because it allows keys ranging from 256 bits to 1024 bits. The post-quantum model requires at least 384 bits while the AES standard only allows keys up to 256 bits. AES would have to be iterated up to four times with different keys to get key lengths comparable to Dragonfire, which also reduces the disparity.

Iterated ciphers are ciphers in which a simple function is applied repeatedly. Each time the function is applied is called a round as shown in FIG. 1. In an n-round iterated cipher, the function is applied n times. The function is usually a combination of a permutation, an XOR between some or all of the intermediate text with the subkey, and lookups into a table called an S-box.

We first introduce and analyze a simpler, related cipher, called Pineapple, to make assessments of the security of the system.

The methodology used in the Pineapple cipher allows us to create $2^{56}$ different ciphers. Dragonfire uses and extends this methodology to, in effect, allow the cipher to be selected by the key. The Dragonfire cipher takes the transparent method of generating S-boxes used by Pineapple and uses them to create a cipher with keyed S-boxes. This defeats most precomputations for cryptanalysis as the S-boxes are now different between sessions. This can be used for pseudorandom number generators keyed pseudorandom number generators (PRNGs). We construct a PRNG called the Dragonfire PRNG. This primitive is used in other systems in this thesis.

Complexity of Symmetric-Key Ciphers

One-way permutations, with some restrictions, cannot be NP-hard to invert unless NP=coNP, which is unlikely (For more information please refer to Gilles Brassard, A Note On The Complexity Of Cryptography, IEEE Transactions on Information Theory, Vol. IT-25, No. 2, March, 1979, pages 232-233, which is hereby incorporated by reference in its entirety). One-way permutations are equivalent to symmetric-key ciphers because symmetric-key ciphers can be constructed from one-way permutations through stream ciphers and one-way permutations can be constructed from symmetric-key ciphers by fixing the key and using feedback (For more information please refer to Pseudorandom Generation From One-Way Functions, R. Impagliazzo and L. Levin and M. Luby Proceedings 21st ACM Symposium on Theory of Computation, 1989, pages 12-24, ACM Press, which is hereby incorporated by reference in its entirety). Therefore, it is unlikely that an NP-hard problem can be reduced to a language based on finding the plaintext of a symmetric-key cipher.

There is further evidence that no language complete in a nontrivial complexity class can be reduced to a language based on finding the plaintext of a symmetric-key cipher where the length of the key is independent of the length of the ciphertext. Suppose that such a reduction existed, then a reduction exists that encodes a language complete for that complexity class as ciphertext and gets its output as plaintext. However, since the length of the key is independent of the length of the ciphertext, the complexity of computing the plaintext is $O(1)$ relative to the input using exhaustive key search. This means that the complexity class being reduced is trivial.

Similarly, if we were to allow the key for a symmetric-key cipher to grow polynomially on the logarithm of the size of the input then the complexity class being reduced is a subset of P. If the size of the symmetric-key cipher were to grow linearly with the size of the input, then, based on Shannon's classic result, we would have unconditional security and there would be no Turing machine that could decide any language that could break it (For more information please refer to A Mathematical Theory of Communication, Claude E. Shannon, journal=Bell Telephone System Technical Publications, 1948; and 1949, Communication Theory and Secrecy Systems, John Wiley and Sons, url http://netlab.cs.ucla.edu/wiki/files/shannon1949.pdf each of which is hereby incorporated by reference in its entirety.

General Design

The general design of an iterated cipher is as in FIG. 1. What happens in the boxes marked f is of interest. Typically, part or all of the intermediate text is XORed with the subkey, a permutation is applied, and the result is broken up into words. Each word is substituted by looking it up in a table known as an S-box. Each occurrence of f is called a round and ciphers have many rounds.

Figure 2:
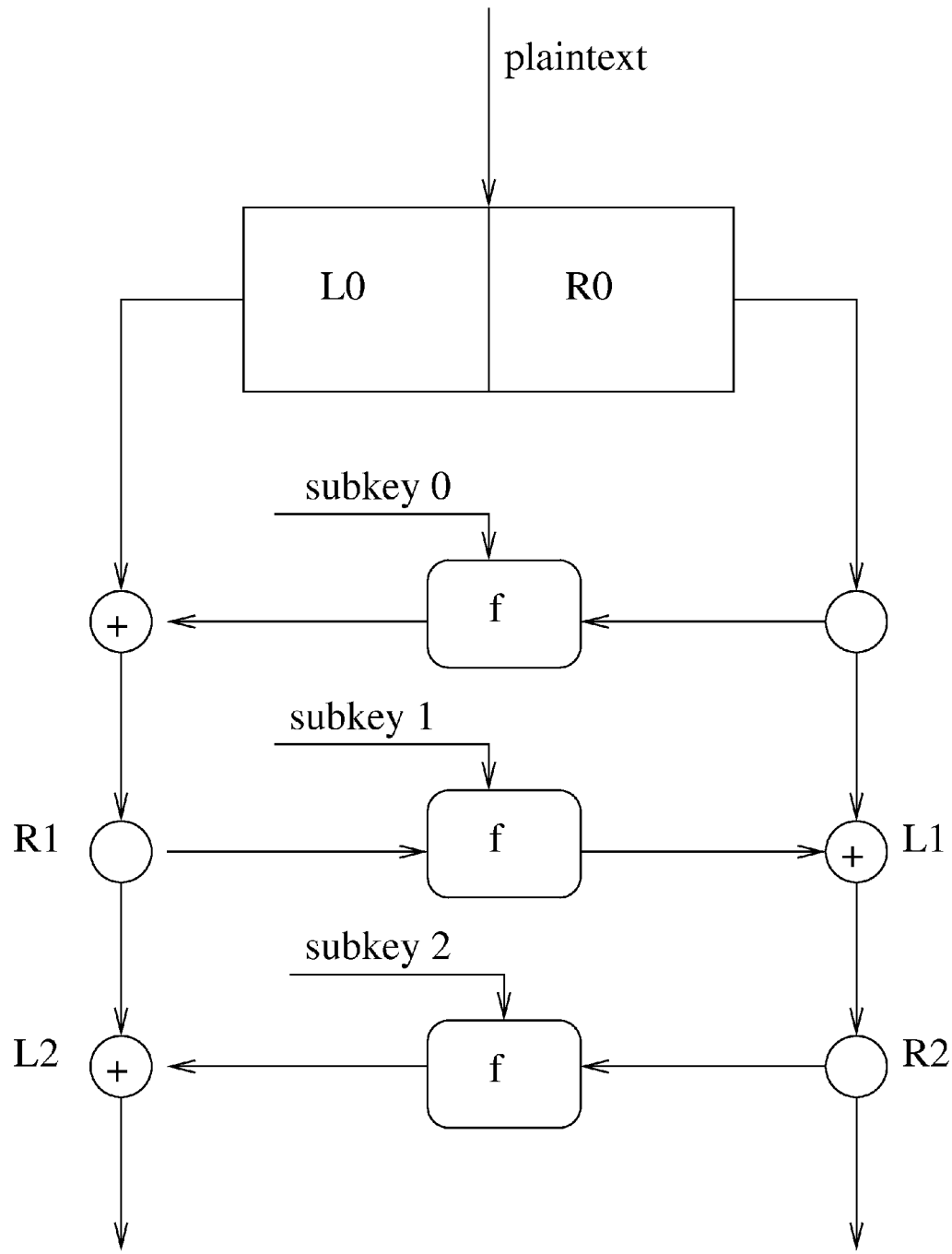
FIG. 2 is a diagram of a Feistel Cipher scheme.

Many ciphers are Feistel schemes. Feistel schemes divide the plaintext into halves and perform operations on one half using the key result with the other half, as shown in FIG. 2. For more information please refer to: Feistel and W. A. Notz and J. L. Smith, Some cryptographic techniques for machine-to-machine data communications, Proceedings of the IEEE, Vol. 63, Number 11, Pages 1545-1554, November, 1975, which is hereby incorporated by reference in its entirety. Examples of Feistel ciphers include DES and FEAL. Most cryptanalysis techniques for block ciphers are primarily targeted against Feistel ciphers. However these attacks are often useful against non-Feistel ciphers such as AES.

A typical round is as in the Pineapple cipher, which is of the Feistel design (For more information on Feistel Cipher, refer to definition section located at the end of this section). The round itself is fairly simple—and reversible with the subkey—it is the iteration of the rounds that makes the cipher hard to break. The Dragonfire cipher is also of the Feistel design.

An important construct of an iterated cipher is the S-box. The S-box, also called the S-table, is a lookup table whose values replace small words that are part of the block. Usually the S-boxes are square meaning that the range of the values is the same as the range of the index, but some ciphers, such as DES, have S-boxes that expand or contract the words. S-boxes must be reversible in order for decryption to be possible. As further described below in the section entitled "Cryptanalytic Attacks", most attacks on iterated ciphers depend on weaknesses in the S-box. The S-box provides the non-linearity in the cipher. For more information please refer to Cryptography: Theory and Practice, Douglas Stinson, Chapman and Hall 2002 which is hereby incorporated by reference in its entirety. Since the S-box only deals with small words, the permutation function combines the results from different words. This is vital to the security of the cipher. For more information please refer to: Applied Cryptography, Bruce Schneier, Wiley, 1996, Second Edition which is hereby incorporated by reference in its entirety.

Cryptanalytic Attacks

There are a number of cryptanalytic attacks on iterated ciphers that we considered when designing the Dragonfire cipher. Some are specifically for Feistel ciphers, others generalize to all iterated ciphers. Linear cryptanalysis is the most successful attack against DES. Linear Cryptanalysis is a cryptanalytic attack that has shown promise against ciphers including DES and FEAL. For more information please refer to Linear Crypatanalysis Method For DES Cipher, Pages 286-397, Springer, Series LNCS, Vol. 765/1994, Year 1994, which is hereby incorporated by reference in its entirety. Bilinear cryptanalysis is a new technique that shows great promise but has, so far, successfully to contrived ciphers. For more information please refer to Feistel Schemes and Bilinear Cryptanalysis, Nicolas Courtois, Advances in Cryptology—Crypto 2004, Pages 23-40, 2004, Springer, Series LNCS, Vol. 3152/2004, which is hereby incorporated by reference in its entirety. Differential cryptanalysis is a powerful cryptanalytic technique pioneered by Biham and Shamir. For more information please refer to Eli Biham and Adi Shamir's, Differential Cryptanalysis of Snefru, Khafre, REDOC-II, LOKI and Lucifer Extended Abstract, Advances in Cryptography—Crypto '91, Series LNCS, Springer, Vol. 576, Pages 156-171, Year 1991, url citeseer.ist.psu.edu/biham91differential.html which is hereby incorporated by reference in its entirety. Here we will briefly mention each of the attacks that we found to be relevant in designing Dragonfire.

Differential Cryptanalysis

Differential cryptanalysis has been used with great success against ciphers including DES. The idea of differential cryptanalysis is that given a pair of plaintexts one wants to compute the probability of the difference between bits in the ciphertexts based on the difference between their plaintexts. This requires knowing many ciphertext/plaintext pairs encrypted with the same key. For more information please refer to Markov Ciphers and Differential Cryptanalysis, Xuejia Lai and James Massey, Advances in Cryptology—Eurocrypt '91, 1991, Springer, Pages 17-39, Series LNCS, Vol. 547/1991, which is hereby incorporated by reference in its entirety. The goal of differential cryptanalysis is to recover the encryption key.

Over the course of the early nineties, results of differential cryptanalysis of DES with increasing rounds up to the full sixteen were presented at cryptology conferences culminating in the publication of the book "The Differential Cryptanalysis of the Data Encryption Standard" by Eli Biham and Adi Shamir in 1993 with the full cryptanalysis of all rounds of DES. For more information please refer to Differential Cryptanalysis of the Data Encryption Standard, Eli Biham and Adi Shamir, 1993, Springer-Verlag, which is hereby incorporated by reference in its entirety.

Linear Cryptanalysis

Linear cryptanalysis was introduced by Matsui in 1994. It is based on the probability of a linear equation involving the plaintext and the key and the ciphertext being satisfied (For more information please refer to Eurocrypt '93—Advances in Cryptology, Mitsuru Matsui, Linear Crypatanalysis Method For DES Cipher, Pages 286-397, Springer, Series LNCS, Vol. 765/1994, Year 1994, which is hereby incorporated by reference in its entirety. Linear cryptanalysis has shown success relative to exhaustive key search against a wide array of iterated ciphers. For more information please refer to Linear Cryptanalysis Of The Fast Data Encipherment Algorithm, Kazuo Ohta and Kazumaro Aoki, Advances in Cryptography—Crypto '94, 1994, Pages 12-17, Series LNCS, Vol. 839/1994, Springer; A Generalization of Linear Cryptanalysis and the Applicability of Matsui's Piling-up Lemma, Carlo Harpes, Gerhad Kramer and James Massey, Advances in Cryptology—Eurocrypt '95, 1995, Pages 24-39, Series LNCS, Vol. 473/1995, Springer; & On Multiple Linear Approximations, Alex Biryukov, Cristophe De Canniere and Michael Quisquater, Advances in Cryptology—Crypto 2004, Pages 1-22, 2004, Series LNCS, Vol. 3152/2004, Springer, each of which is hereby incorporated by reference in its entirety. There was a great deal of interest in linear cryptanalysis in the mid-nineties and a resurgence of interest was shown in it at the Crypto 2004 cryptology conference. For more information please refer to On Multiple Linear Approximations, Alex Biryukov, Cristophe De Canniere and Michael Quisquater, Advances in Cryptology—Crypto 2004, Pages 1-22, 2004, Series LNCS, Vol. 3152/2004, Springer, which is hereby incorporated by reference in its entirety.

Bilinear Cryptanalysis

Bilinear cryptanalysis is a new technique introduced by Courtois in 2004. Bilinear cryptanalysis takes advantage of specific mathematical characteristics of Feistel ciphers. Bilinear cryptanalysis has been applied to DES, but has not been met with the success enjoyed by other attacks.

Like linear cryptanalysis, bilinear cryptanalysis involves a linear approximation to the cipher. Unlike linear cryptanalysis, bilinear cryptanalysis uses algebraic properties of Feistel ciphers to simplify and enhance the use of the approximations. For more information please refer to Feistel Schemes and Bi-linear Cryptanalysis, Nicolas Courtois, Advances in Cryptology—Crypto 2004, Pages 23-40, 2004, Springer, Series LNCS, Vol. 3152/2004, which is hereby incorporated by reference in its entirety.

Algebraic Cryptanalysis

In some cases a cipher can be completely modeled by a set of equations over a group. In these cases, if the set of equations can be solved, the solution yields the cipher key. As an example, AES is completely described by a set of quadratic equations. For more information please refer to Essential Algebraic Structure With The AES, Sean Murphy and Matthew Robshaw, Series LNCS, Vol. 2442/2002, Advances in Cryptology—Crypto 2002, 2002, Pages 1-16, Springer, which is hereby incorporated by reference in its entirety.

The Pineapple Cipher

We introduce the Pineapple Cipher as a foundational cipher for exploring properties of the Dragonfire cipher as well as a primitive used in the Dragonfire initialization algorithm. Later in this patent, we introduce Dragonfire. It is useful to have a wide variety of ciphers to choose from so that if one gets broken, only a fraction of the traffic is compromised. The Pineapple Cipher is based on the well-understood Feistel design. We will use the Pineapple cipher with a key of zeros as a transformation in the Dragonfire cipher. This is an unusual construction and a length-preserving one-way permutation could be used instead.

Design

Referring now to the Pineapple encryption algorithm of FIG. 3, the defining characteristic of the Pineapple cipher is the eight S-boxes. In order to construct an S-box, a number n is chosen such that $2^{n}+1$ is a Fermat prime. A Fermat prime is a prime number one less than a power of two. Examples of such numbers include n=4, n=8 and n=16. A number, $g_j$ is chosen such that $g_j^{2^n}+1 \equiv 1 \pmod{2^n+1}$ but $g_j^x \not\equiv 1 \pmod{2^n+1}$ for $0 < x 2^n$. Such a number is called a generator. The S-boxes are then defined as:

$$S[j][i] = g_j^i - 1 \pmod{2^n + 1}$$

The user may optionally add an integer constant to i in the right hand side of the equation. The SAFER cipher also uses exponentiation modulo 257 to construct S-boxes, but where SAFER uses the same generator for all of the S-boxes, Pineapple uses a different generator for each S-box.

This transparent method of choosing S-boxes prevents the introduction of trapdoors that make some types of cryptanalysis easy. Ignoring the possibility of shifting the S-box by adding a constant to the index, $2^{56}$ different 128-bit ciphers with 8-bit S-boxes are possible with the same Feistel structure and permutation.

S-boxes chosen in this manner are nonlinear. When using this method it is desirable to use different generators to generate different S-boxes for different subblocks. The Fermat primes 257 and 65537 are particularly well-suited to S-box generation because they are in the range of table sizes commonly used for S-boxes. Pineapple uses 257.

Since the modulus is prime and $g_j$ is a generator, the resulting S-box is a permutation over $Z_2n$. This makes it reversible and balanced.

The generators chosen to make the eight S-boxes for Pineapple are: 254 206 160 155 126 107 71 51. These generators were randomly picked from a table of generators modulo 257. This makes Pineapple S-boxes a fixed instance of Dragonfire's keyed S-boxes.

The basic design of the cipher is the Feistel design shown in FIG. 2 which is also represented in FIG. 3 (For more information on Feistel Cipher, refer to definition section located at the end of this section). If $x_{k,i,j}$ is the jth bit of the ith byte of the input to the kth round, then the round permutation is defined to be:

$$b_{k,j,i} = a_{k,i,j}$$

Figure 4:
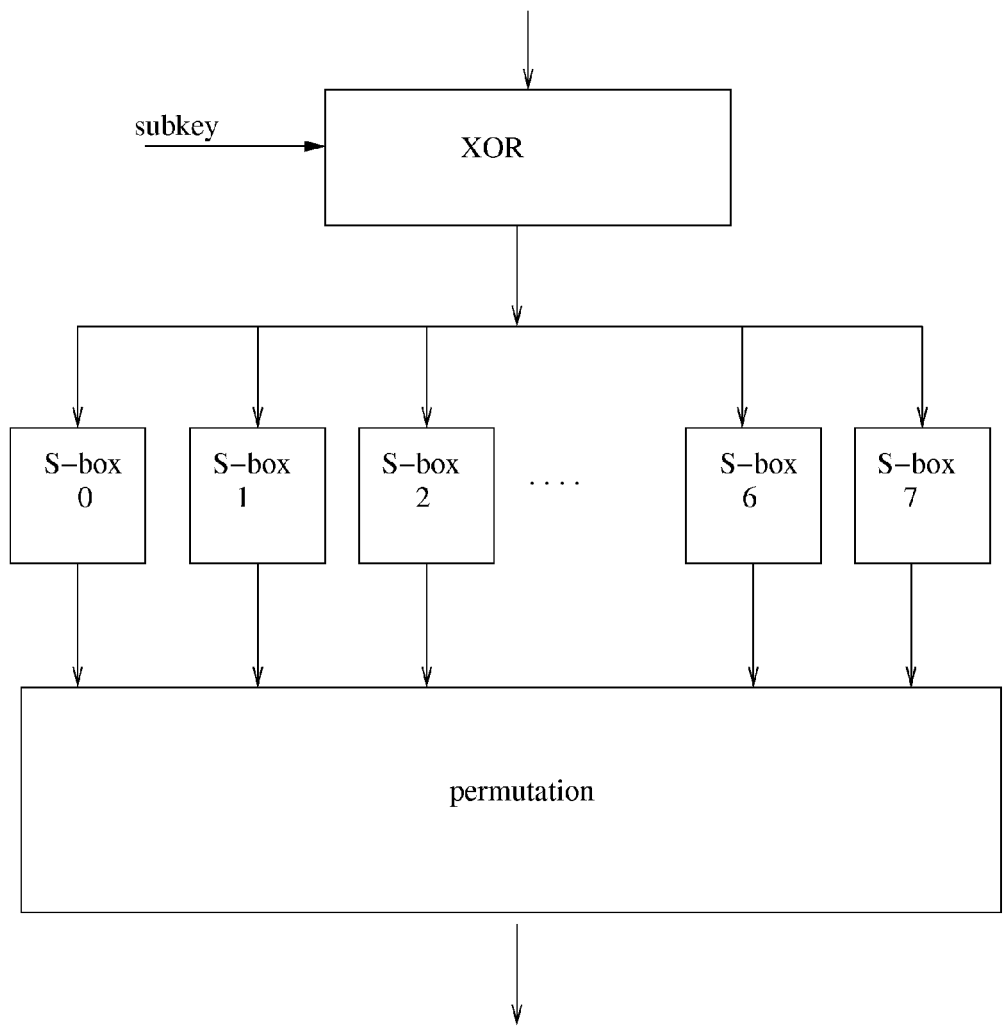
FIG. 4 is a diagram of a Pineapple scheme.

The f-function in the round is shown in FIG. 4.

Each word is 128 bits long, so the left and right halves are 64 bits each. This allows complete diffusion through the half-word in the round permutation. The subkey is XORed with the half-word before the S-box is applied. After the S-box is applied, the round permutation is applied.

The Pineapple cipher is theoretically complete after three rounds but it does not show the avalanche effect until five rounds (see table in FIG. 10) (For more information on complete and avalanche effect, refer to definition section located at the end of this section.) This is in contrast to DES which is complete after five rounds or FEAL which is complete after four rounds. For more information please refer to Fast Data Encipherment Algorithm FEAL, Akihiro Shimizu and Shoji Miyaguchi, Advances in Cryptology—Eurocrypt '87, Springer, 1988, Pages 267-281, Series LNCS, Vol. 304/1988, which is hereby incorporated by reference in its entirety. The S-boxes of the Pineapple cipher are highly nonlinear.

The configuration of the Pineapple cipher is for n=8, the block size to be 128 bits and the key size to be 256 bits. The subkeys are computed by taking the first 64 bits of the key. The key is rotated left sixteen bits after each round for encryption (right for decryption). There are sixteen rounds.

The Pineapple algorithm is described in FIG. 3 and FIG. 2. Common Lisp programs to compute generators and S-boxes are available from the inventor Michael de Mare.

Security

Reasons to be optimistic about the security of Pineapple include the fact that random S-box permutations have proven to be strong against differential cryptanalysis For more information please refer to On the Distribution of Characteristics in Bijective Mappings, Luke O'Connor, March 1995, Journal of Cryptology, Pages 67-86, Vol. 8, Number 2, Springer, which is hereby incorporated by reference in its entirety. Since the S-box is balanced by being a permutation and is relatively large, it is likely to be resistant to both linear and differential cryptanalysis For more information please refer to Amr M. Youssef and Stafford E. Tavares, Resistance of Balanced S-Boxes to Linear and Differential Cryptanalysis, Information Processing Letters, Vol. 56, Number 5, Pages 249-252, 1995, url citeseer.ist.psu.edu/66829.html, which is hereby incorporated by reference in its entirety. For more information on balanced S-boxes, refer to definition section located at the end of this section. The use of exponentiation in the S-box should result in highly non-linear equations for algebraic cryptanalysis. The GOST cipher, the Blowfish cipher, and the Twofish cipher all assume that a random S-box is likely to be cryptographically strong. If we accept this assumption then we expect our cipher to have a high probability of being strong unless the mathematical structure of our S-box has a property that makes it less secure. If such a property exists, it would also affect the SAFER family of ciphers and no such weakness has been discovered.

Correlation Experiment

In an experiment designed to test for an obvious weakness (which no cipher should have), we generate a 128×128 matrix and populate it with the number of times the corresponding two bits are the same over the course of many encryptions with all of the subkeys set to zero. If there is a statistically significant correspondence, this can be used by a cryptanalyst to attack the cipher. Zeroing out the subkeys is the same as not applying the subkeys in the cipher. Sixteen of the strongest correlations were analyzed: the eight pairs that are the same the most often and the eight that are the same the least often. The algorithm for a single iteration is described in algorithm of FIG. 7. We computed the ratio of the number of times that two bits are the same over the number of runs. The closer this ratio is to ½ in the most extreme cases, the stronger the cipher is against some simple types of cryptanalysis which involve consulting a statistical table to learn the likely value of the keys based on a known plaintext/cipher text pair. In tables of FIG. 5 and FIG. 6 we show the results of this experiment. As the table shows, the maximum bias is approximately 0.0006, a value which could be caused by random noise for this number of iterations.

The experiment was performed on one hundred million random plaintext blocks. This required about an hour on a 2.8 GHz Pentium 4 processor with a 512 KB cache. This fit in cache because the table only requires 64 KB of memory and the S-boxes only require 2 KB. The code required to run the test (including encryptions and analysis) fits into 11 KB.

Avalanche Experiment

To compute the actual number of rounds for the avalanche effect in Pineapple we performed the experiment in FIG. 8 many times and computed statistical information from the results. We found that after five rounds, the average number of changed bits was 64 which is half of the block size. This is consistent with the avalanche effect sought in cipher design. We also kept track of the variance and calculated the standard deviation. The standard deviation after six rounds is consistent with the standard deviation for random data. The results can be found in FIG. 9. The experiment was run for ten million iterations requiring about half an hour of CPU time on a 2.8 GHz Pentium 4 with a 512 KB cache.

An iteration of this experiment chooses a random value (with either a fixed key or a random key) and encrypts it, remembering the value after each round. A single bit in the input value is then changed. It is encrypted again, again remembering the value after each round. For each round, the two values are compared and the Hamming distance is computed and stored as the result.

The algorithm for this experiment is similar to the algorithm for differential cryptanalysis. There are some differences, though. If we were doing differential cryptanalysis, we would choose a single bit, or set of bits, to flip for the entire experiment. Also, for differential cryptanalysis, rather than keeping track of the number of bits that changed, we would keep track of which bits changed. If some particular bits changed more often than others, this would be noted.

Differential Cryptanalysis

We base our differential experiments on the following book. For more information please refer to Differential Cryptanalysis Of The Data Encryption Standard, Eli Biham and Adi Shamir, 1993, Springer-Verlag which is hereby incorporated by reference in its entirety. Actual differential cryptanalysis is somewhat more complicated and requires resources and luck. We tried a simple algorithm for differential cryptanalysis on the Pineapple cipher which is described in FIG. 10 and operates as follows. A random key is selected for the entire experiment. For each bit, a random vector is generated and encrypted. The bit is changed and the new vector is encrypted. The difference between the two vectors is considered with each different bit counted separately. This is done many times. The eight bits that change most and least are presented in FIG. 11. The number of iterations may not be sufficient to see actual statistical correlations through the noise generated by the distribution.

This experiment was run for ten million iterations on an Athlon 64 3000+ 64-bit computer with 512 KB of cache. It required nine and a half hours of CPU time.

The experiment was modified to try all 2-bit differences. This required 1,928 hours of runtime. It was run on Stevens' HPCF cluster. The most significant differences are shown in FIG. 12. The differences are not greater than what is expected from random noise.

Performance

The Pineapple cipher was implemented in C++ using the gcc compiler and tested on an AMD Opteron 250 processor running at 2.4 GHz with a 1 MB cache. It encrypted 1775.5 KB per second (14204 kbits/second). It was tested on a symmetric multiprocessing system, but only one CPU was used for the test. It is likely that significant performance gains could be made by coding the encryption algorithm in assembly language. The most obvious place where significant performance gains can be made is in the implementation of the permutation.

The performance bottleneck of Pineapple is in the permutation, not the S-boxes, so a much faster cipher could be built using our technique for obtaining S-boxes. We chose to use our slower permutation function because it is easier to formally verify that the cipher becomes complete after three rounds. Even using this permutation there is much room for optimization, possibly by coding the assembler code by hand with a view towards taking advantage of the superscalar aspects of the target processor.

Dragonfire Cipher

Where the Pineapple Cipher uses fixed S-boxes, the Dragonfire Cipher chooses S-boxes as a function of the key. In effect, the Dragonfire cipher selects among $2^{64}$ different possible ciphers based on the key. Since the algorithms are similar, the performance is similar, i.e. Dragonfire can encrypt at least 14 megabits per second on a modern processor using our implementation based on the results of the similar Pineapple cipher. In fact, a test was done on an Opteron processor in which Dragonfire encrypted 12 megabits per second for sixteen seconds. Many cryptanalytic methods use precomputations based on the S-boxes. This can be made considerably more difficult by varying the S-boxes between sessions. To vary the S-boxes, the encryption program can keep a table of generators for the selected Fermat prime and use the first bytes of the key as indices into this table. This technique is used in the Dragonfire cipher. After the key is established, S-boxes can be generated from these generators. While this increases the setup time for the cipher, it makes cryptanalytic methods based on precomputed statistical tables which are dependent on the S-boxes considerably more difficult. We also do more processing on the subkeys resulting in a desirable security property. We show in Theorem below that the subkeys are pseudo-independent. (For more information on pseudo-independent, refer to definition section located at the end of this section). This means that discovering bits of a subkey does not lead to other bits of the subkeys as seen in definition for pseudo-independent. We achieve this property by encrypting them using Pineapple and a known key.

Figure 13:
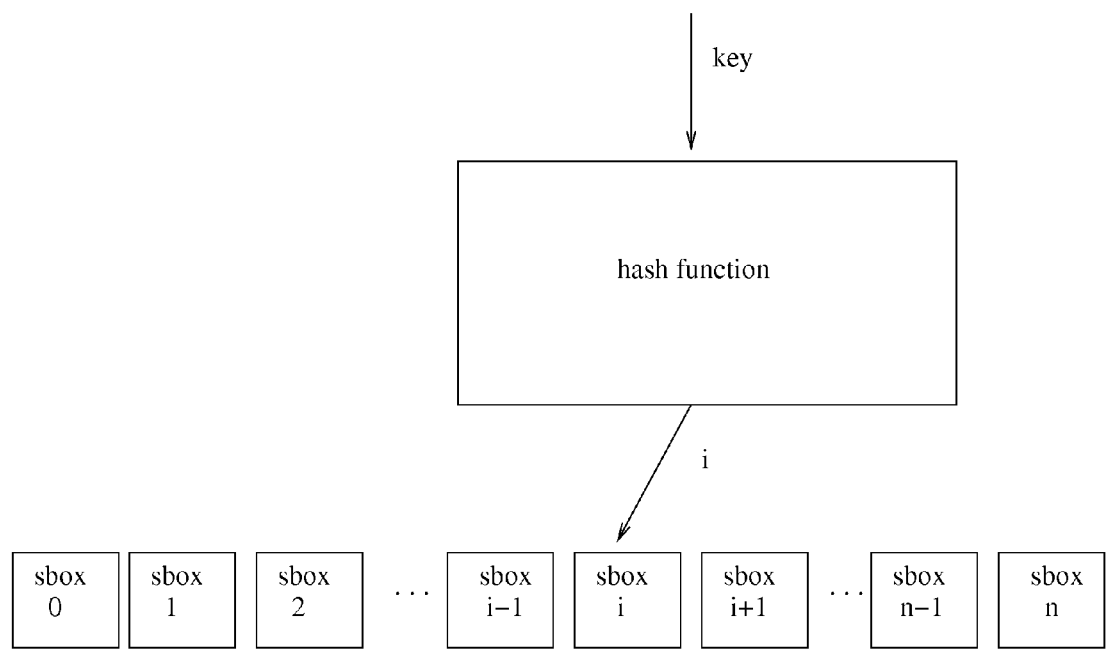
FIG. 13 is polymorphic S-box selection.
Figure 14:
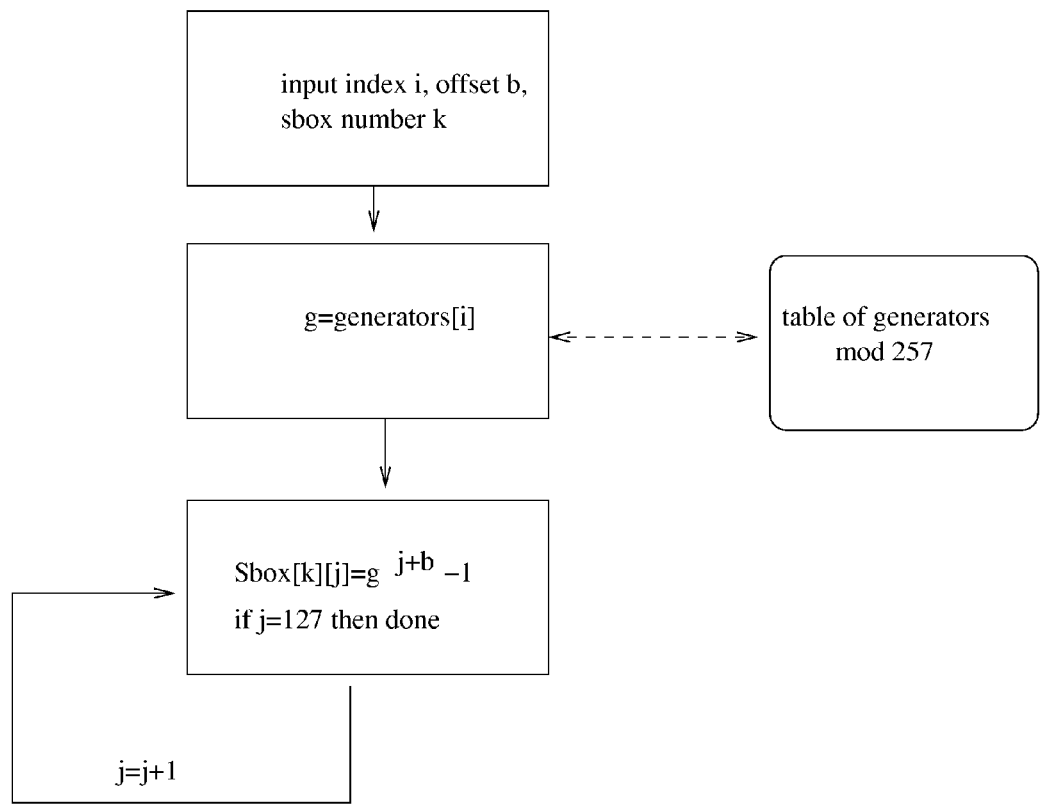
FIG. 14 is S-Box generation for Dragonfire.

The Dragonfire cipher computes a 64-bit hash of the key to use to generate the S-boxes. By hash, we mean a function h: x→y such that |x| is variable and |y| is fixed. We call the technique of choosing each S-box from a list of S-boxes with known properties polymorphism making Dragonfire S-boxes polymorphic S-boxes. (see FIG. 13). Polymorphic S-boxes are novel to Dragonfire. Each byte of the hash represents an S-box, 7 bits give the generator and one bit is added to the table values modulo 257 (see FIG. 14).

Selecting S-boxes requires additional initialization for the Dragonfire cipher as shown in FIG. 17. The encryption algorithm differs slightly from Pineapple and is shown in FIG. 18. The function p(x) represents applying the Pineapple cipher to x with a key of zeros.

Figure 16:
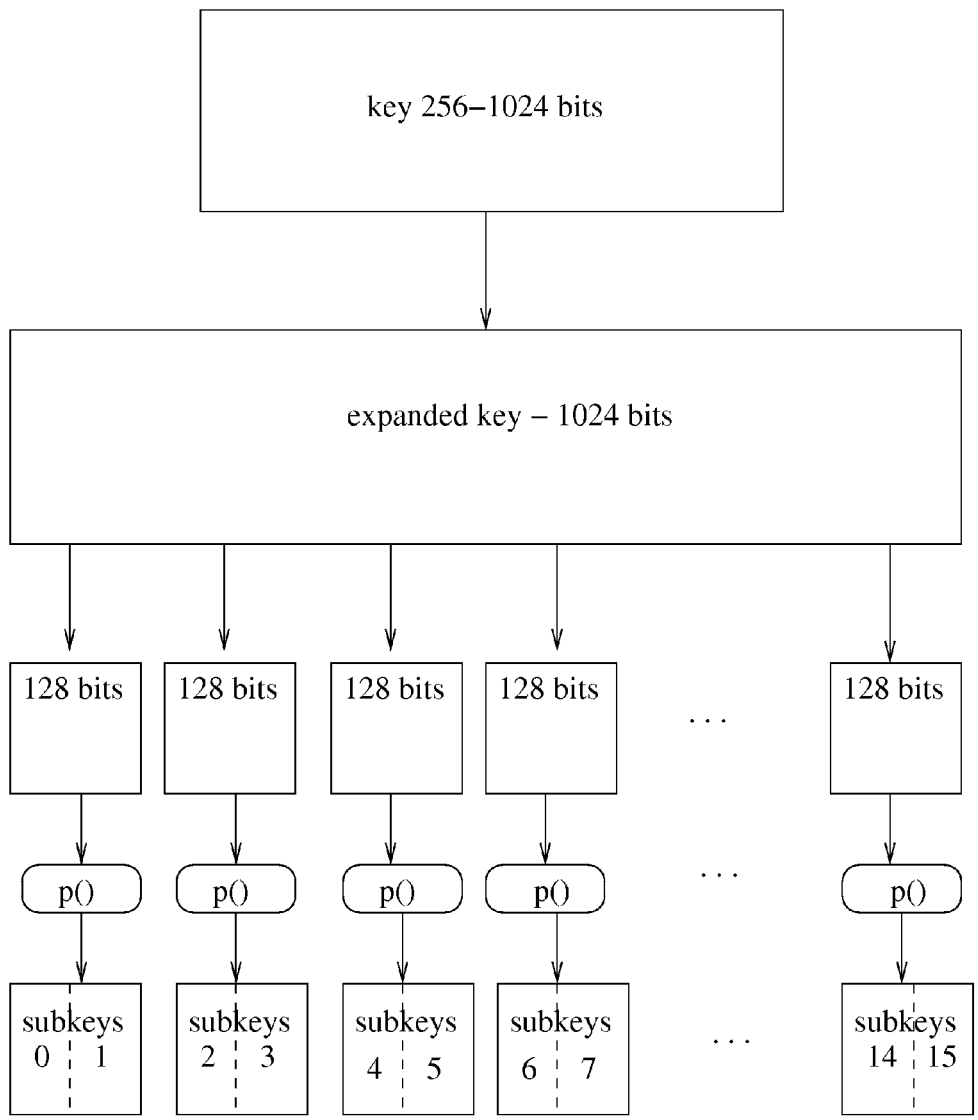
FIG. 16 is Dragonfire key scheduling.

The subkeys are derived from encryptions of the key. This achieves the pseudo-independence property. In fact, in order to learn any bits of the key from the subkey, two adjacent subkeys must be completely known. This is because each bit of the two adjacent subkeys depends on all 128-bits of the original key that correspond to the two subkeys and vice versa (see FIG. 16) through the avalanche property of the Pineapple cipher. This reduces the effectiveness of cryptanalytic attacks such as differential cryptanalysis that discover bits of the subkeys. The key scheduling algorithm is illustrated in FIG. 16.

DECRYPTION. Decryption is accomplished by running through the encryption steps in reverse order using inverses of the S-boxes in place of the S-boxes. Inverses of the S-boxes can be obtained by swapping the index into the S-box with its value.

S-BOX GENERATION. If the S-boxes of a Dragonfire encryption are compromised, it is still not immediately obvious to the cryptanalyst based on this information what the key is, but the security may be reduced by 64 bits because this is the amount of information contained in the selection of the S-boxes. By XORing and truncating the results of the p-function, the security of the keys generating the S-boxes is preserved. The key, k, is broken up into 128-bit words, $k_1, k_2, \ldots$. A hash, h(k) is computed as follows, $h(k)=p(k_1) \oplus p(k_2) \oplus \ldots$. The first sixty-four bits of h(k) are used to choose the S-boxes. Clearly, if the S-boxes are discovered, their value does not completely determine what any of the bits of the key are. Blowfish, on the other hand, requires the S-boxes to remain secret but is not known to be less secure than ciphers with open S-boxes.

KEY SCHEDULING. The subkeys for Dragonfire are generated from the key using Pineapple so that discovery of a bit of a subkey does not result in the discovery of bits of other subkeys. We call this property pseudo-independence and this makes cryptanalytic techniques which yield individual bits of subkeys more difficult (For more information on pseudo-independence, refer to definition section located at the end of this section.) More efficient cryptanalytic methods than exhaustive key search learn the values of bits of subkeys and use those to determine bits of other subkeys and bits of the key. Pseudo-independence makes it so that it is necessary to learn two or more complete subkeys in order to learn any bits of the key or bits of other subkeys. This allows us to be flexible in key sizes, allowing 256-bit, 384-bit, 512-bit, 768-bit, and 1024-bit keys. There is a theoretical lower bound on a type of method known as black-box methods for NP ∩ coNP of $\Omega(2^{n/3})$ for quantum Turing Machines. For more information please refer to Charles H. Bennett, Ethan Bernstein, Gilles Brassard and Umesh Vazirani, Strengths and Weaknesses of Quantum Computing, Journal SIAM Journal on Computing, Vol. 26, Number 5, Pages 1510-1523, Year 1997, Society for Industrial and Applied Mathematics, which is hereby incorporated by reference in its entirety. Thus if a 128-bit key gives a sufficient work factor to stop an ordinary adversary then a 384-bit key gives a sufficient work factor against quantum computers using black-box algorithms that are not yet known. Likewise, a 768-bit key gives a post-quantum work factor equivalent to 256-bit keys.

Pseudo-independent—We say that $s_1$ and $s_2$ are pseudo-independent if the following statements are true:

1) The maximum probability for a bit of k to be determined given less than all of the bits of $s_1$ or $s_2$ is: $Pr(det(k_i))<1/|k|$.

2) The maximum probability that a bit of $s_1$ can be determined given only $s_2$ is: $Pr(det(s_{1,i}))<1/|<1/|s_1|$.

3) The maximum probability that a bit of $s_2$ can be determined given only $s_1$ is: $Pr(det(s_{2,i}))<1/|<1/|s_2|$.

THEOREM 3. If p and $p^{-1}$ are complete and show the avalanche effect, then the subkeys of Dragonfire are pairwise pseudo-independent.

PROOF In order to show that the subkeys of Dragonfire are pair-wise independent, we must show that for any pair of subkeys of Dragonfire, properties (1) and (2) hold. Property (3) will then hold by selecting the same pair with the order reversed.

(1) Since $y=p^{-1}(x)$ is complete and shows the avalanche effect, the probability of a bit of y being changed by changing one bit of x is ½. Therefore, if j bits of x are not determined, there are $2^j$ possible values of y. This means that the probability that a bit of y will remain constant under all combinations of j bits is $½^j$. The maximum key length of Dragonfire is 1024. Even if all the bits of a subkey is known, there are still 64 bits of x undetermined without an adjacent subkey $½^{64}<\frac{1}{1024}$.

(2) Suppose that all the bits of the subkey, $s_2$ are known. Then there are two possibilities, either $s_1$ and $s_2$ are generated by the same bits of k or they are not. First let us consider the case where they do not. We will bear in mind for both cases that y=p(x) is complete and shows the avalanche effect so that changing a single bit of x will change each bit of y with probability ½. The same is true for $p^{-1}$.

Suppose that the bits of k which determine $s_2$ are known. The maximum number of bits of k which $s_1$ and $s_2$ share is then 32. That means that there are $2^{64-32}=232$ possible values of $s_1$ for this value of $s_2$. The probability of any given bit of $s_1$ being fixed by this value of $s_2$ is then $½^{32}$. $|s_1|=64$ and $½^{32}<\frac{1}{64}$.

Now let us consider the case where $s_1$ and $s_2$ are determined by the same bits of k. Suppose, further, that we know all the bits of $s_2$. Then there are $2^{64}$ possible values of the bits of k which determine $s_1$ and $s_2$. That means that each bit of $s_1$ has a probability of remaining constant under all these combinations with probability $½^{64}<\frac{1}{1024}$.

Pseudorandom Number Generator

There are many different types of pseudorandom number generators known to those in the art as possible to use with Dragonfire. In this section, we define the Dragonfire PRNG. The Dragonfire PRNG has the advantage that it can be configured to have cryptovariables whose total number of bits is sufficient for post-quantum security. The pseudorandom number generator is built from the Dragonfire cipher. The cryptovariables for the PRNG are the key, the mask, and the initialization vector (IV). The key may optionally be used to generate subkeys which are required for post-quantum security. Subkeys are derived from the encryption key and XORed with the half-blocks in the same manner as Dragonfire and Pineapple. The mask and the initialization vector (IV) form the seed and are the inputs to the algorithms for generating random bits. The key is used at initialization time to generate the S-boxes using the Dragonfire initialization routine in FIG. 17.

There are two algorithms for pseudorandom number generation corresponding to the two modes: fast and secure. The secure method is given in Algorithm 10. The fast algorithm is given in Algorithm 9. If a mask is not specified the default mask is: F1 54 03 92 E4 C2 BD 32 D1 23 63 F1 29 25 5E AA. The reason for specifying the mask is to prevent the unlikely situation where the high bits of the key bytes are zero and the initialization vector (IV) is zero. Without a mask, this would lead to the generator always producing zero if the subkeys are not used. If the mask is secret it provides additional security against learning the initialization vector (IV) from the bits that are output.

For post-quantum security, the key may be used to generate subkeys using the Dragonfire initialization scheme. If this is done, the subkeys are XOR'd in the algorithm in the same manner as Dragonfire.

Randomness tests were conducted on both random number generation modes. The secure mode and fast mode p-values are in the same range. This suggests that either mode gives good statistical randomness based on these measures. The advantage of using secure mode over fast mode is that it is much harder for an analyst to determine the cryptovariables such as the initialization vector. This is because much less information is revealed in each application. The NIST battery of tests, was run on the secure mode, the fast mode and 3DES. The results are shown in table of FIG. 15. For more information please refer to Andrew Rukhin, Juan Soto, James Nechvatal, Miles Smid, Elaine Barker, Stefan Leigh, Mark Levenson, Mark Vangel, David Banks, Alan Heckert, James Dray and San Vo, A STATISTICAL TEST SUITE FOR RANDOM AND PSEUDORANDOM NUMBER GENERATORS FOR CRYPTOGRAPHIC APPLICATIONS, Note NIST Special Publication 800-22, May, 2001, which is hereby incorporated by reference in its entirety. All the tests were successful except for the Fast Fourier Transform test. 3DES also failed that test, suggesting a problem with the Fast Fourier Transform test.

Discussion

Iterated ciphers, particularly Feistel ciphers, have become the standard design methodology for symmetric key ciphers. While any single round can be broken easily, the iteration of the rounds sixteen times or more results in security that would not be achieved with a single round.

From DES to AES, iterated ciphers have been named as standards for the protection of communications and data. The fact that Skipjack is iterated and was used by the military shows that they are also used for the protection of classified information. While sophisticated cryptanalytic attacks have been developed, overall these ciphers have remained secure. For more information please refer to Applied Cryptography, Bruce Schneier, Wiley, 1996, Second Edition; Handbook of Applied Cryptography, Alfred Menezes, Paul C. van Oorschot and Scott Vanstone, CRC Press, 1997; Cryptography: Theory and Practice, Douglas Stinson, Chapman and Hall, 2002, each of which is hereby incorporated by reference in its entirety.

A transparent method of obtaining S-boxes enables ciphers to be built without trust in the designers. Our specific method seems to have properties desirable in a cipher and does not immediately yield to differential cryptanalysis. There are other forms of cryptanalysis which may be tried including linear, bilinear \ and algebraic attacks. For more information please refer to Linear Cryptanalysis of the Fast Data Encipherment Algorithm, Kazuo Ohta and Kazumaro Aoki, Advances in Cryptography—Crypto '94, 1994, Pages 12-17, Series LNCS, Vol. 839/1994, Springer; A Generalization of Linear Cryptanalysis and the Applicability of Matsui's Piling-up Lemma, Carlo Harpes, Gerhad Kramer and James Massey, Advances in Cryptology—Eurocrypt '95, 1995, Pages 24-39, Series LNCS, Vol. 473/1995, Springer; On Multiple Linear Approximations, Alex Biryukov, Cristophe De Canniere and Michael Quisquater, Advances in Cryptology—Crypto 2004, Pages 1-22, 2004, Series LNCS, Vol. 3152/2004, Springer; Feistel Schemes and Bi-linear Cryptanalysis, Nicolas Courtois, Advances in Cryptology—Crypto 2004, Pages 23-40, 2004, Springer, Series LNCS, Vol. 3152/2004; Sean Murphy and Matthew Robshaw, Essential algebraic structure with the AES, Series LNCS, Volume 2442/2002, Advances in Cryptology—Crypto 2002, Pages 1-16, Springer, each of which is hereby incorporated by reference in its entirety. Algebraic attacks seem especially promising for analyzing AES.

The Pineapple cipher follows the design patterns and values of other successful ciphers. It follows the design values of diffusion and confusion with the proven Feistel architecture. The S-boxes are based on group exponentiation so equations to model the cipher would be highly non-linear. The cipher most similar to Pineapple is SAFER.

Using Pineapple's method of obtaining S-boxes and its general design, $2^{56}$ different ciphers may be built. If we also add the option of rotating each S-box by one, this brings the number to $2^{64}$ S-boxes which has the effect of having this many different ciphers depending on the key. Using this insight, we have constructed a cipher with polymorphic S-boxes, which we call the Dragonfire Cipher.

The Dragonfire cipher has the advantages of Pineapple and keyed S-boxes. Keyed S-boxes also gives it the advantages of Blowfish. Most cryptanalysis methods require the precomputation of tables that depend on the S-boxes. By changing the S-boxes with each session, the precomputation of these tables becomes impractical. A cryptanalyst would have to precompute $2^{64}$ tables to account for the different possibilities. Dragonfire also has pseudo-independent subkeys which further increase the difficulty of cryptanalysis. The cipher most similar to Dragonfire is Twofish which also has both keyed S-boxes and subkeys which are hashed from the key using a function that prevents one from learning bits of key from only a few bits of subkey. Unlike Twofish, the S-boxes in Dragonfire are balanced and have predictable security properties.

Non Limiting Examples

In one embodiment, the present invention can be implemented as a circuit as described above is part of the design for an integrated circuit chip. Those skilled in the are will use the above description in a language such as VHDL or Verilog to synthesize a chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare chip, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard, or other input device, and a central processor.

Also, the present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

Definitions Used in this Invention

Feistel Cipher—Feistel is an iterated cipher with a block size of 2t is called a Feistel cipher if the input data is broken into two t-bit blocks at each round i, these blocks are called $R_i, L_i$; and in the round function, a function f is specified such that $L_i = R_{i-1}$ and $R_i = L_{i-1} \oplus f(R_{i-1}, K_i)$ where $K_i$ is the subkey for the ith round. For more information please refer to Handbook of Applied Cryptography, Alfred Menezes, Paul C. van Oorschot and Scott Vanstone, CRC Press, 1997, each of which is hereby incorporated by reference in its entirety Typically the function, f, is composed of three parts. In the first part, $R_{i-1}$ is combined with the subkey, $K_i$. In the second part, small words of the result of the first part are used as an index into a substitution table, called an S-box}, and the words of the result of the second part is the value found in the S-box. In the third part the result of the second part is permuted with a permutation function. This means that the bits are not changed but their positions are according to a fixed permutation. It is the permutation function that allows the results of the different S-boxes to be combined.

Complete—A cipher is complete if every output logically depends on every input

Avalanche Effect—The avalanche effect occurs when a change of any single input bit causes each of the output bits to change with probability ½. For more information please refer to Handbook of Applied Cryptography, Alfred Menezes, Paul C. van Oorschot and Scott Vanstone, CRC Press, 1997; On the f-function of FEAL, Walter Fumy, Springer, Advances in Cryptology—Crypto '87, 1988, Pages 434-438, Series LNCS, Vol. 293/1988, each of which is hereby incorporated by reference in its entirety.

Balanced—An S-box is balanced if each output symbol occurs an equal number of times when all the input symbols are tried. For more information please refer to Amr M. Youssef and Stafford E. Tavares, "Resistance of Balanced S-Boxes to Linear and Differential Cryptanalysis", Information Processing Letters, Vol. 56, Number 5, Pages 249-252, Year—1995, url citeseer.ist.psu.edu/66829.html each of which is hereby incorporated by reference in its entirety.

DEFINITION 25. We are given three bit strings, k, $s_1$, and $s_2$ such that $s_1 = f(k)$ and $s_2 = g(k)$, where f and g can be computed in polynomial time by a deterministic Turing Machine and $|s_1| = |s_2|$. We write that the probability of a value v being completely determined as Pr (det(v)) and we use the index i over the bits of a string.

What is claimed is:

1. A computer-implemented method for encrypting a block of data, the method comprising:
   executing with a computer programming instructions for receiving a variable length key;
   selecting, using a hash of the variable length key, a plurality of encrypting S-boxes with known security properties using the variable length key;
   generating a plurality of fixed length encrypting subkeys based upon the variable length key;
   hashing the encrypting subkeys to form encrypting subkeys that are pseudo-independent; and
   encrypting a block of data using the S-boxes and the encrypting subkeys in a predetermined number of rounds;
   wherein sub-keys k, $s_1$ and $s_2$ are pseudo-independent when
   i) a maximum probability for a bit of k to be determined given less than all bits of $s_1$ and $s_2$ is $Pr(det(k_i)) < 1/|k|$
   ii) a maximum probability that a bit of $s_1$ can be determined given only $s_2$ is $Pr(det(s_{1,i})) < 1/|s_1|$ and
   iii) a maximum probability that a bit of $s_2$ can be determined given only $s_1$ is $Pr(det(s_{2,i})) < 1/|s_2|$.

2. The computer-implemented method of claim 1, wherein the selecting the plurality of encrypting S-boxes includes selecting the plurality of encrypting S-boxes which are balanced keyed S-boxes so that a set of uniformly chosen inputs from a range of inputs produces a set of outputs within a range by permutation.

3. The computer-implemented method of claim 2, wherein the selecting the plurality of encrypting S-boxes includes selecting the plurality of encrypting S-boxes which are encrypting polymorphic S-boxes.

4. The method of claim 2, wherein the selecting the plurality of encrypting S-boxes includes selecting the plurality of the encrypting S-boxes by using exponentiating generators modulo 257.

5. The method of claim 4, wherein the exponentiating generators are selected from a table using the variable length key.

6. The method of claim 5, wherein the table includes 128 generators modulo 257.

7. The method of claim 6, wherein eight bits of hash of key are used to select the S-Box, seven bits for the generator and one bit for the offset.

8. The method of claim 7, wherein the S-boxes are used in each the rounds.

9. The computer-implemented method of claim 1, further comprising:
receiving the variable length key;
creating a plurality of decrypting S-boxes using a discrete logarithm; generating a plurality of variable length decrypting subkeys based upon the variable length key; and
decrypting the block data using the S-boxes and the decrypting sub-keys in a predetermined number of rounds.

10. The computer-implemented method of claim 1, wherein the variable length key has a length from 256 bits to 1024 bits in 128 bit increments.

11. A computer program product for encrypting a block of data in main storage in a computer system, the computer program product comprising:
a non-transitory storage medium readable by said computer system, said storage medium storing programming instructions for performing:
receiving a variable length key;
selecting, using a hash of the variable length key, a plurality of encrypting S-boxes with known security properties using the variable length key;
generating a plurality of fixed length encrypting subkeys based upon the variable length key;
hashing the encrypting subkeys to form encrypting sub-keys that are pseudo-independent; and
encrypting a block of data using the S-boxes and the encrypting subkeys in a predetermined number of rounds;
wherein sub-keys k, $s_1$ and $s_2$ are pseudo-independent when
i) a maximum probability for a bit of k to be determined given less than all bits of $s_1$ and $s_2$ is $Pr(det(k_i))<1/|k|$
ii) a maximum probability that a bit of $s_1$ can be determined given only $s_2$ is $Pr(det(s_{1,i}))<1/|s_1|$ and
iii) a maximum probability that a bit of $s_2$ can be determined given only $s_1$ is $Pr(det(s_{2,i}))<1/|s_2|$.

12. The computer program product of claim 11, wherein the programming instructions of selecting the plurality of encrypting S-boxes includes selecting the plurality of encrypting S-boxes which are balanced keyed S-boxes so that a set of uniformly chosen inputs from a range of inputs produces a set of outputs within a range by permutation.

13. The computer program product of claim 12, wherein the programming instructions of selecting the plurality of encrypting S-boxes includes selecting the plurality of encrypting S-boxes which are encrypting polymorphic S-boxes.

14. The computer program product of claim 11, wherein the selecting the plurality of encrypting S-boxes includes selecting the plurality of the encrypting S-boxes by using exponentiating generators modulo 257, the exponentiating generators are selected from a table using the variable length key, the table includes 128 generators modulo 257, and wherein eight bits of hash of key are used to select the S-Box, seven bits for the generator and one bit for the offset.

15. A system for encrypting a block of data comprising:
a computer memory configured to store machine instructions; and
a processor in communication with said computer memory, said processor configured to access the memory and perform
receiving a variable length key;
selecting, using a hash of the variable length key, a plurality of encrypting S-boxes with known security properties using the variable length key;
generating a plurality of fixed length encrypting subkeys based upon the variable length key;
hashing the encrypting subkeys to form encrypting sub-keys that are pseudo-independent; and
encrypting a block of data using the S-boxes and the encrypting subkeys in a predetermined number of rounds;
wherein sub-keys k, $s_1$ and $s_2$ are pseudo-independent when
i) a maximum probability for a bit of k to be determined given less than all bits of $s_1$ and $s_2$ is $Pr(det(k_i))<1/|k|$
ii) a maximum probability that a bit of $s_1$ can be determined given only $s_2$ is $Pr(det(s_{1,i}))<1/|s_1|$ and
iii) a maximum probability that a bit of $s_2$ can be determined given only $s_1$ is $Pr(det(s_{2,i}))<1/|s_2|$.

16. The system of claim 15, wherein the selecting the plurality of encrypting S-boxes includes selecting the plurality of encrypting S-boxes which are balanced keyed S-boxes so that a set of uniformly chosen inputs from a range of inputs produces a set of outputs within a range by permutation.

17. The system of claim 16, wherein the selecting the plurality of encrypting S-boxes includes selecting the plurality of encrypting S-boxes which are encrypting polymorphic S-boxes.

* * * * *